United States Patent

Burnett

[15] 3,647,031
[45] Mar. 7, 1972

[54] PARKING BRAKE ACTUATOR FOR DISC BRAKES

[72] Inventor: Richard T. Burnett, South Bend, Ind.
[73] Assignee: The Bendix Corporation
[22] Filed: Oct. 3, 1969
[21] Appl. No.: 863,482

[52] U.S. Cl. .......................... 188/72.6, 188/72.9, 188/106 F
[51] Int. Cl. ......................................................... F16d 55/26
[58] Field of Search ........................... 188/72.6, 72.9, 106 F

[56] References Cited

UNITED STATES PATENTS

| 3,326,329 | 6/1967 | Harrison | 188/72.9 X |
| 3,459,282 | 8/1969 | Hoenick et al. | 188/106 F |
| 2,371,158 | 3/1945 | Eby | 188/72.9 |

*Primary Examiner*—George E. A. Halvosa
*Attorney*—C. F. Arens and Plante, Arens, Hartz, Hix and Smith

[57] ABSTRACT

A parking brake actuator for a caliper disc brake includes an elongated member shiftable in the caliper housing for actuating the brake shoes. The member is shifted by a lever mounted on the housing that is swingable about a point substantially coaxial with the member. A toggle link interconnects the lever and the member for shifting the latter in response to movement of the lever.

4 Claims, 5 Drawing Figures

INVENTOR.
RICHARD T. BURNETT

INVENTOR.
RICHARD T. BURNETT

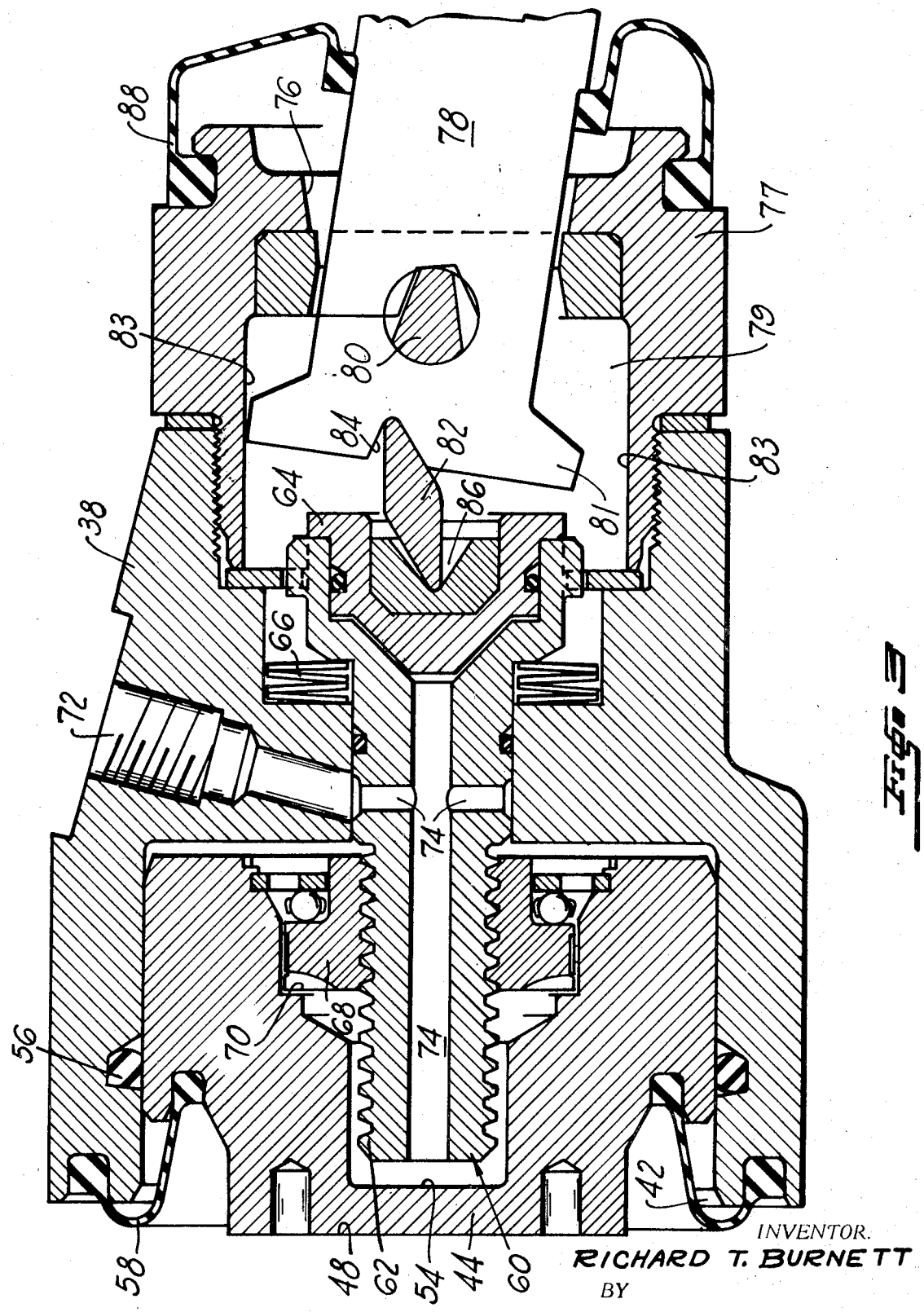

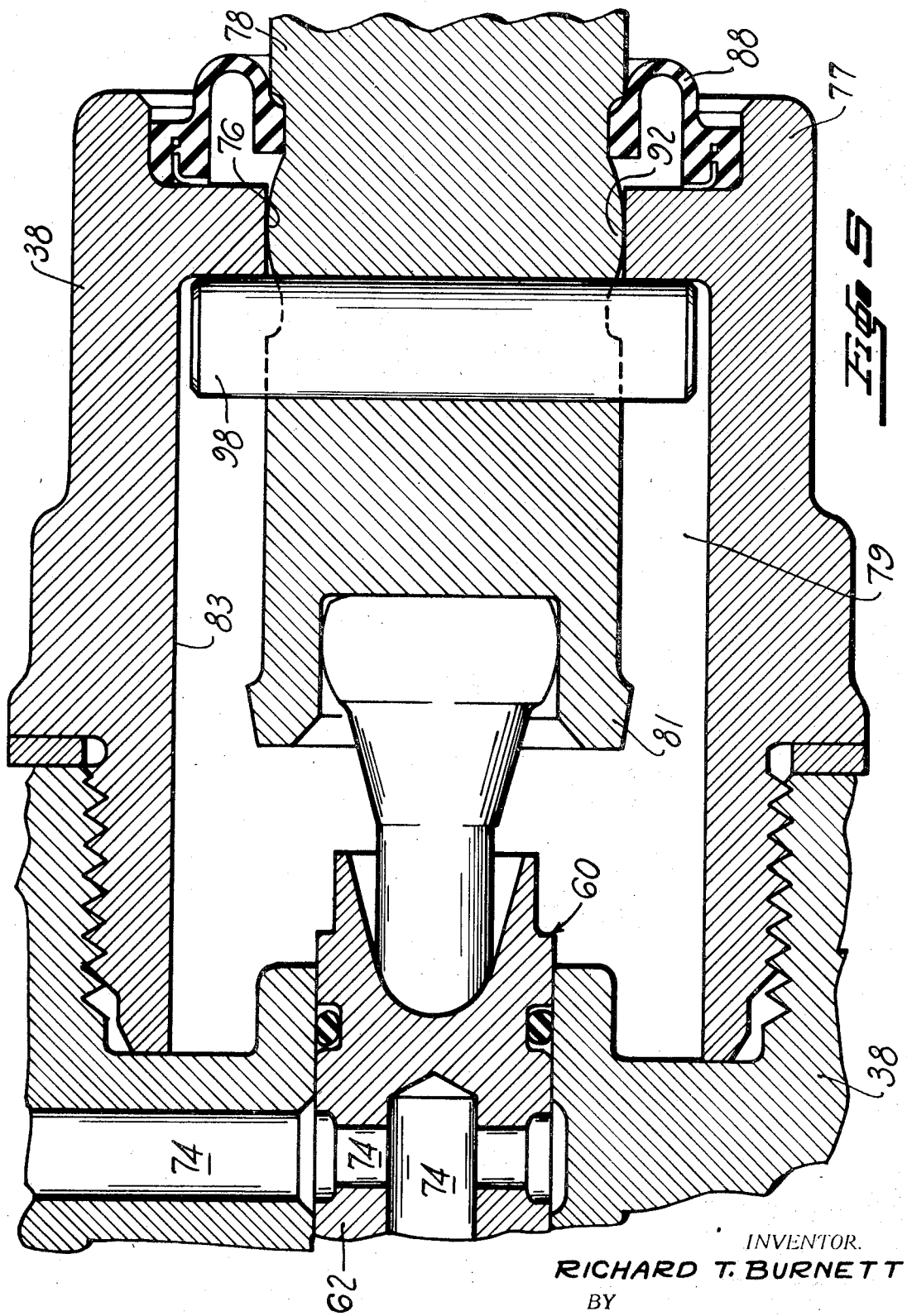

3,647,031

PARKING BRAKE ACTUATOR FOR DISC BRAKES

BACKGROUND OF THE INVENTION

This invention relates to a mechanical actuator for a vehicular disc brake assembly.

Although disc brakes are normally actuated by hydraulic pressure, it is necessary to also provide a mechanical actuation mechanism so that a parking or emergency brake might be provided. Such devices are normally quite complicated, requiring the interaction of numerous shafts, levers, springs and detents for their operation. The complex nature of these assemblies not only increases initial fabrication and assembly costs, but also increases service problems. Their bulk requires that space be made available adjacent the vehicle wheels at a point where space is oftentimes critical in modern automotive designs. Furthermore, it is also desirable that the mechanical actuators require only a minimum operating force of the vehicle operator. Since substantial force is required to force the brake shoes against the disc in modern disc brakes, the mechanical actuator must provide a force-multiplying mechanism.

SUMMARY OF THE INVENTION

Therefore, an important object of the instant invention is to provide a mechanical actuator for disc brakes that is compact and that has a minimum of parts.

Another important object of the present invention is to furnish a parking brake actuator for disc brakes having only a simple lever coupled to the caliper housing for actuating the brakes.

Another important object of the invention is to provide a device that multiplies the applied force into a force sufficient to actuate the brake shoes.

Yet another important object of the invention is to provide a parking brake actuator for disc brakes that is operable by moving a lever extending from the caliper housing in a variety of directions.

BRIEF DESCRIPTION OF THE DRAWINGS

FIG. 3 is an enlarged transverse cross-sectional view taken through the caliper of the brake;

FIG. 5 is an enlarged, fragmentary cross-sectional view similar to FIGS. 3 and 4 but illustrating a second alternate embodiment of the invention.

DESCRIPTION OF THE PREFERRED EMBODIMENT

Figures 1, 4:
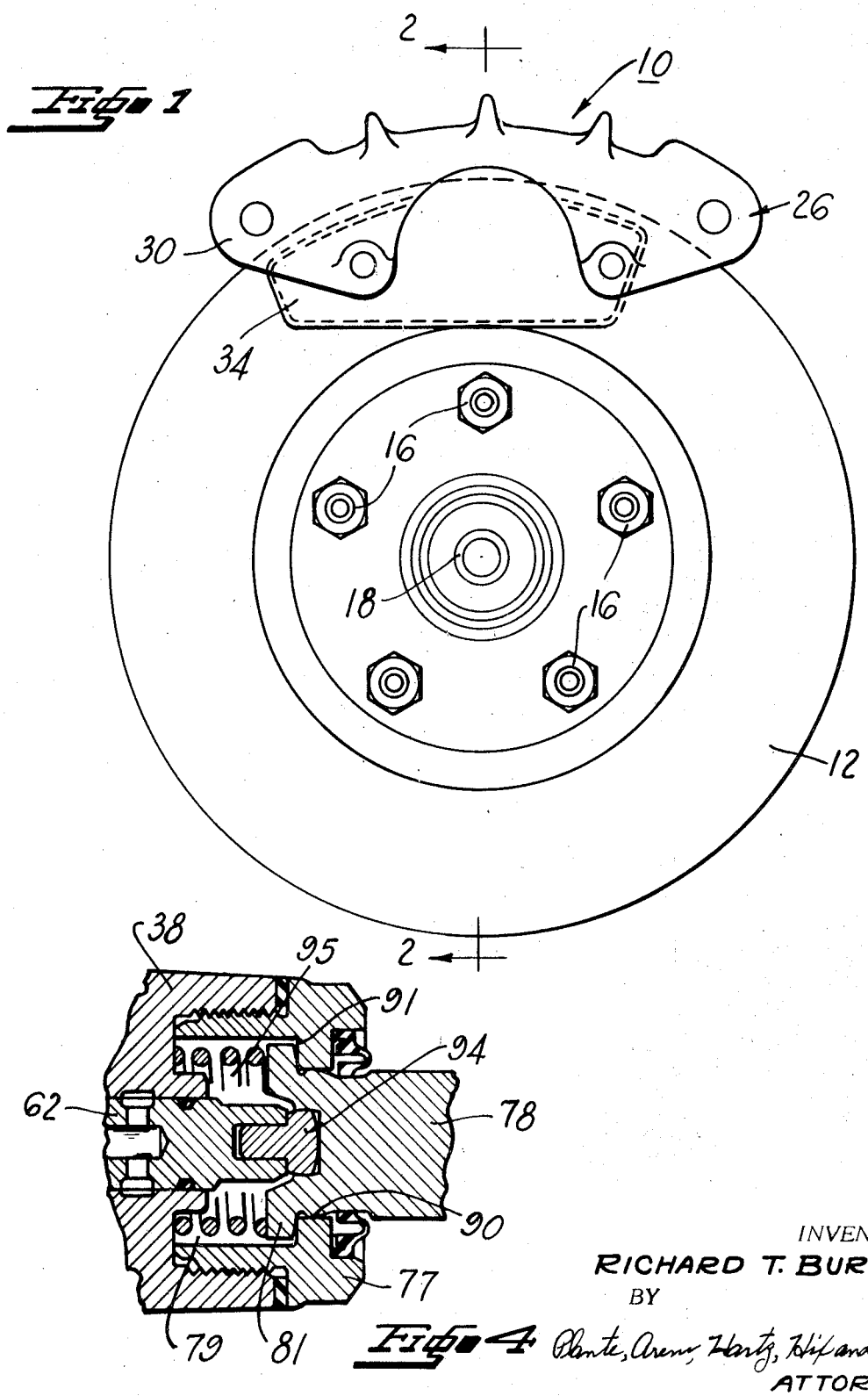
FIG. 1 is a side elevational view of a disc brake made pursuant to the teachings of the present invention.
FIG. 4 is an enlarged, fragmentary, cross-sectional view similar to FIG. 3 but showing an alternate embodiment of the invention.
Figure 2:
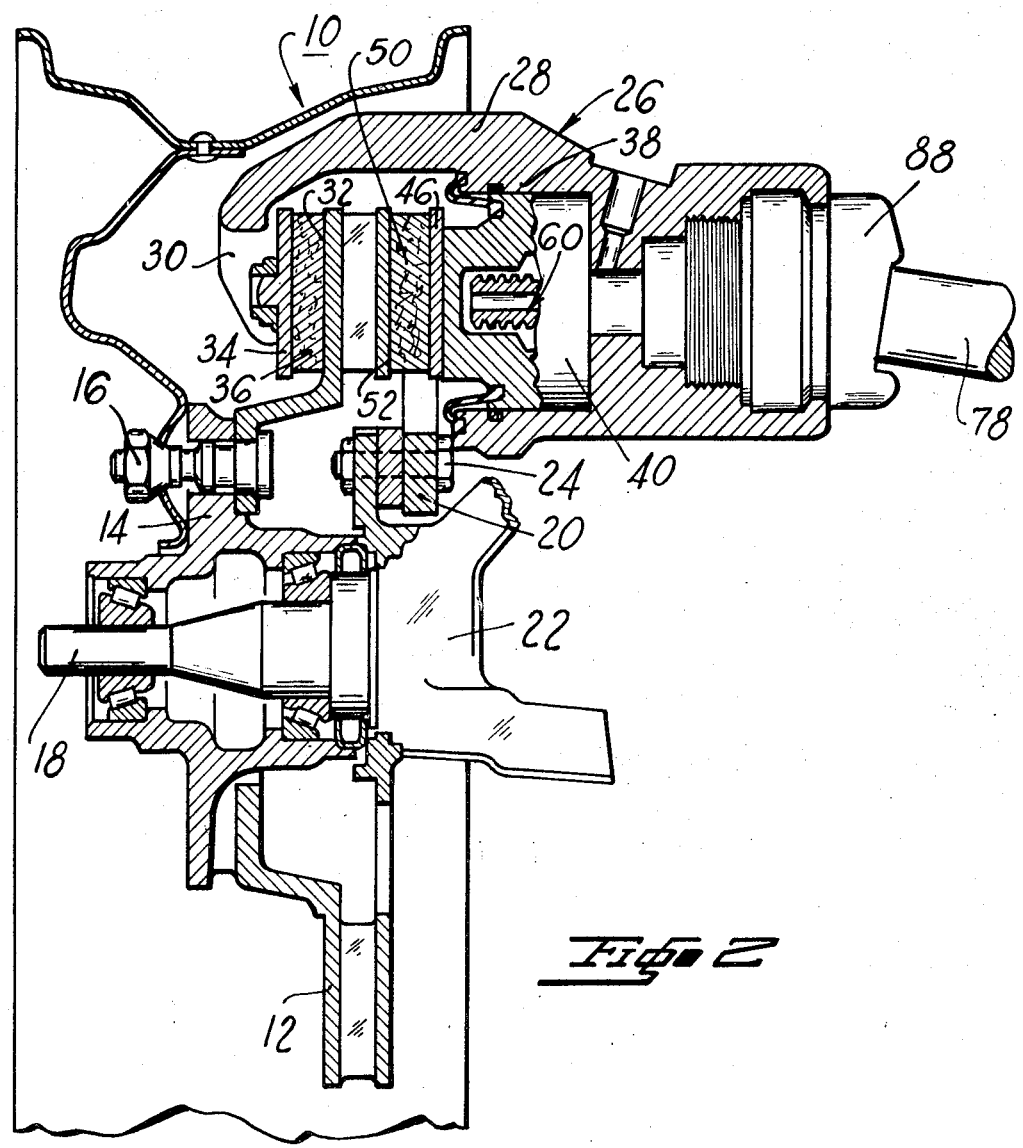
FIG. 2 is an enlarged, fragmentary, cross-sectional view taken along line 2—2 of FIG. 1.

Referring now to the drawings, particularly FIGS. 1 and 2, a disc brake assembly 10 includes a rotor 12 rigidly secured to a wheel 14 of a vehicle by bolts 16. As is customary, the wheel 14 is rotatably mounted on an axle spindle 18 that extends from the vehicle. A torque member 20 is secured to a nonrotative part of the vehicle, such as a spindle 22, by bolts 24. A caliper assembly 26 is slidably mounted on the torque member 20 in the manner taught by U.S. Pat. No. 3,388,774, owned by the assignee of the present invention. Caliper assembly 26 includes a bridge piece 28, and a radially inwardly extending portion 30 overlying a friction face 32 of the rotor 12. A brake shoe 34, having a friction pad 36, is mounted on the portion 30.

Caliper 26 further includes a housing 38 defining a chamber 40 therewithin having an open end 42. A piston 44 is reciprocably carried in the chamber 40 and is shiftable therein toward and away from the end 42. A brake shoe 46 is in contact with a face 48 of the piston 44 and has a friction pad 50 mounted thereon which engages a friction face 52 of the rotor 12. Brake shoe 46 is slidably supported on the torque member 20 as fully explained in the above-referenced U.S. Pat. No. 3,388,774. A second face 54 of the piston 44 forms a surface against which fluid pressure may act. Appropriate seals 56 are provided between the piston 44 and the housing 38 to prevent fluid pressure from escaping from chamber 40. A flexible boot 58 interconnects the piston 44 and the housing 38 to prevent foreign material from entering the open end 42 of the chamber 40.

An elongated member 60 is operatively connected to the piston 44 via an automatic adjuster 68, and includes a threaded post 62 yieldably biased towards a seat 64 by spring means 66. The adjuster mechanism 68 is mounted on the post 62 and includes a wall 70 that engages the rear face of the piston 44. The operation of the post 62, seat 64, spring 66, and adjuster 68 is more completely described in copending U.S. Pat. application Ser. No. 863,481, filed Oct. 3, 1969, and now U.S. Pat. No. 3,610,373 owned by the assignee of the instant invention, and incorporated herein by reference as need be for a complete understanding of the present invention. An inlet 72 is provided in the housing 38 and appropriate conduits 74 are formed in the post 62 to admit fluid pressure against the face 54 of the piston 44.

A plug 77 is threadedly received by the housing 38 and defines a chamber 79 therewithin. An exterior bore 76 extends through the plug 77 and communicates with the chamber 79. A lever 78 extends from the chamber 79 through the bore 76 and is pivotally connected to the plug 77 by a pivot pin 80 that bridges the chamber 79. The lever 78 is movable in an arcuate path about the pin 80 from a position at an acute angle one side of the axis of the member 60 to a position at an acute angle on the opposite side of the axis of the member 60. Flange 81 of lever 78 abuts inner surface 83 of member 77 in the starting position and limits the motion of lever 78 when flange 81 contacts the opposite wall. Motion is transmitted from the lever 78 to the member 60 by connecting mechanism or toggle link 82. Recesses 84 and 86 are formed in the lever 78 and in the seat 64 of member 60 respectively. A resilient boot 88 interconnects the lever 78 and the housing 38 to prevent foreign material from entering the chamber 40. The lever 78 is actuated by the vehicle operator through any of the well-known expedients familiar to those skilled in the art.

It will be noted that the toggle link 82 is provided with radiused surfaces on the ends thereof which engage the recesses 84 and 86, respectively. The radius of these radiused surfaces is substantially less than the length of the toggle link 82 and the distance between the pivot 80 and the recess 84. Therefore, a substantially "knife-edge" engagement is provided between toggle 82 and the recesses 84 and 86, so that the friction forces generated by engagement of the opposed ends of the toggle link 82 by their engagement with the recess 84, 86 act through a relatively short lever arm, equal to the radius of the radiused surfaces, to produce a relatively low frictional torque. On the other hand, the actuating force acts through a substantially greater lever arm, which is dependent upon the length of the toggle link 82 and the distance between the pivot pin 80 and the recess 84. Although the length of this actuating lever arm varies as will be described later herein, it will always be substantially greater than the radius of the radiused surfaces. Therefore, the percentage of actuating torque lost by friction is relatively low, thereby providing a very high mechanical efficiency.

DESCRIPTION OF THE MODIFIED EMBODIMENTS

In the modified forms of the invention illustrated in FIGS. 4 and 5 elements substantially the same as those of the preferred embodiment retain the same reference characters. In the embodiment of FIG. 4 the pivot pin connection between the lever 78 and the housing 38 is replaced by a circumferentially extending, radially projecting camming surface 90 extending from the lever 78 that cooperates with a circumferential wall 91 of the plug 77 surrounding the bore 76. This construction permits rocking motion of the lever 78 with respect to the plug 77. A connecting link 94 transmits arcuate movement of the lever 78 to the member 60 to force the latter toward the disc. Spring means 95 urge the lever 78 into engagement with the plug 77.

In the embodiment of FIG. 5, a pin 98 projects from the lever 78 in a radial direction. The pin 98 reacts against that portion of the plug 77 circumscribing the bore 76 to permit the lever 78 to be swung in an arcuate path about the plug 77. The pin 98 thus provides a pivoting coupling between the lever 78 and the plug 77. A circumferentially extending, radially projecting camming surface 92 extends from the lever 78 for engagement with the bore 76.

MODE OF OPERATION

In operation, the operator of the vehicle in which the brake is installed actuates a mechanism in the driver's compartment that is connected to the lever 78 by a flexible cable (not shown), swinging the lever 78 in an arc about the pin 80 from a first position defined by the engagement of one edge of the lever with the wall of the bore to a second position in which the axes of the lever, the toggle link, and the plunger are in substantial alignment with one another. It will be noted that as the lever is pivoted toward the second position, the acute angle defined between the axis of the toggle link and the axis of the lever is progressively reduced, to decrease the length of the effective lever arm between the pivot pin 80 and the axis of the toggle 82 as the lever 78 is shifted. Therefore, the plunger or elongated member 62 will be shifted quite quickly as the lever 78 is moved away from the first position and will be shifted more slowly as the lever 78 approaches the second position. Consequently, the operator-applied force is multiplied at a rather low ratio by the lever 78 as the lever is moved away from the first position, but at a rather high ratio as the lever 78 approaches the second position. The toggle connection transmits arcuate motion of the lever 78 into lateral motion of the member 60. Post 62, seat 64 and adjuster mechanism 68 are shifted as a unit until the adjuster mechanism 68 engages the rear face of the piston 44. Further movement of the lever 78 causes piston 44 to shift in chamber 40, engaging friction pad 50 with the rotor 12. Those skilled in the art will recognize that as the piston 44 is shifted, reaction forces acting through the housing 38 and the bridge 28 will also shift friction pad 36 into engagement with the rotor 12, thus stopping the vehicle. When the lever 78 is moved to a position releasing the brake, action of the spring 66 maintains the member 60 and toggle 82 in engagement with each other and maintains the engagement of the toggle 82 and the lever 78. Also, with the lever in brake release position, resilient action of the seals 56 returns the piston 44 to the right viewing FIGS. 2—3, as is conventional in the art, thus disengaging the friction pads 36, 50 from the rotor 12.

Thus, it can be seen that the present invention possesses significant advantages over heretofore available devices. The entire parking brake actuator includes but three major parts. Each part of the assembly is relatively simple and easy to manufacture. No costly bearings or finely turned shafts are required. The design provides for ease of assembly, as no close-toleranced parts need be fitted together. The length of the lever 78 extending from the housing 38 may, within limits, be varied as desired; therefore, the force delivered to the member 60 may be chosen by specifying the length of the lever arm while maintaining the operating force required by the operator at a minimum. The modified embodiments provide an actuator in which the lever may be moved in a number of directions to actuate the parking brake, thus further increasing the flexibility of the device.

Although the invention has been described in connection with certain embodiments, various other adaptations of the invention will become apparent to those skilled in the art. It is my intention to include within the scope and spirit of this invention all equivalent structures whereby the same or substantially the same results are obtained.

I claim:
1. In a disc brake:
a rotor having a pair of friction faces;
a torque member;
a pair of friction elements, one of said elements being disposed adjacent each of said friction faces;
a caliper slidably mounted on said torque member and operatively connected to each of said friction elements for urging the latter into braking engagement with their corresponding friction faces;
said caliper including a housing defining a bore therewithin;
fluid motor means including a piston slidable in said bore for effecting a service actuation of said brake; and
mechanical actuating means for effecting a parking actuation of said brake;
said mechanical actuating means including a plunger slidably mounted in said bore, a lever movably mounted in said bore and extending from said housing, and a toggle link interconnecting said lever and said plunger to slide said plunger toward the rotor as the lever is moved; and
means closing one end of said bore defining an opening, said lever extending through the opening defined by the closing means and having a circumferentially extending, radially projecting camming surface cooperating with the circumferential wall of the opening to permit rocking movement of the lever with respect to the housing.

2. In a disc brake:
a rotor having a pair of friction faces;
a torque member;
a pair of friction elements, one of said elements being disposed adjacent each of said friction faces;
a caliper slidably mounted on said torque member and operatively connected to each of said friction elements for urging the latter into braking engagement with their corresponding friction faces;
said caliper including a housing defining a bore therewithin;
fluid motor means including a piston slidable in said bore for effecting a service actuation of said brake; and
mechanical actuating means for effecting a parking actuation of said brake;
said mechanical actuating means including a plunger slidably mounted in said bore, first pivot means rigidly secured to said housing and extending across said bore, a lever rotatable about said pivot means for movement relative to said housing, a toggle link having a pair of opposed ends, second pivot means connecting one of said opposed ends of said toggle link to said lever, third pivot means connecting the other of said opposed ends of said toggle link to said plunger, said lever pivoting about said first pivot means from a first position in which the edge of the lever engages the wall of the bore to a second position in which the edge of the lever is disposed away from the wall of the bore, the pivoting movement os said lever being transmitted to said plunger by said toggle link to effect a parking actuation;
said second pivot means including a recess in the end of said lever, said one opposed end of said toggle link having a radiused surface engaging said recess, the radius of said radiused surface being substantially less than the distance between said first pivot means and said recess to provide a substantially "knife-edge" engagement between the one opposed end and the recess, whereby the friction force generated by engagement of the one opposed end with the recess acts through a relatively short lever arm to produce a relatively low-frictional torque and the actuating force acts through a substantially larger lever arm to provide a relatively high actuating torque.

3. In a disc brake:
a rotor having a pair of friction faces;
a torque member;
a pair of friction elements, one of said elements being disposed adjacent each of said friction faces;
a caliper slidably mounted on said torque member and operatively connected to each of said friction elements for urging the latter into braking engagement with their corresponding friction faces;

said caliper including a housing defining a bore therewithin;

fluid motor means including a piston slidable in said bore for effecting a service actuation of said brake; and mechanical actuating means for effecting a parking actuation of said brake;

said mechanical actuating means including a plunger slidably mounted in said bore, first pivot means rigidly secured to said housing and extending across said bore, a lever rotatable about said pivot means for movement relative to said housing, a toggle link having a pair of opposed ends, second pivot means connecting one of said opposed ends of said toggle link to said lever, third pivot means connecting the other of said opposed ends of said toggle link to said plunger, said lever pivoting about said first pivot means from a first position in which the edge of the lever engages the wall of the bore to a second position in which the edge of the lever is disposed away from the wall of the bore, the pivoting movement of said lever being transmitted to said plunger by said toggle link to effect a parking actuation;

said second pivot means including a recess in the end of said lever, said one opposed end of said toggle link having a radiused surface engaging said recess, the radius of said radiused surface being substantially less than the length of the toggle link between said opposed ends to provide a substantially "knife-edge" engagement between the one opposed end and the recess, whereby the friction force generated by engagement of the one opposed end with the recess acts through a relatively short lever arm to produce a relatively low-frictional torque and the actuating force acts through a substantially larger lever arm to provide a relatively high actuating torque.

4. The invention of claim 3:

said third pivot means including a recess in said plunger, said other opposed end of said toggle link having a radiused surface engaging said recess, the radius of said radiused surface being substantially less than the length of the toggle link between said opposed ends.

* * * * *